United States Patent
Hakes et al.

(10) Patent No.: US 11,518,456 B2
(45) Date of Patent: Dec. 6, 2022

(54) SHELF DESIGN FOR INCREASED LINK LIFE

(71) Applicant: Caterpillar Inc., Peoria, IL (US)

(72) Inventors: David J. Hakes, Princeville, IL (US); William P. Shoemaker, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 463 days.

(21) Appl. No.: 16/802,691

(22) Filed: Feb. 27, 2020

(65) Prior Publication Data
US 2021/0269108 A1  Sep. 2, 2021

(51) Int. Cl.
*B62D 55/21* (2006.01)
*B62D 55/14* (2006.01)
*B62D 55/12* (2006.01)

(52) U.S. Cl.
CPC ............. *B62D 55/21* (2013.01); *B62D 55/12* (2013.01); *B62D 55/14* (2013.01)

(58) Field of Classification Search
CPC ......... B62D 55/21; B62D 55/12; B62D 55/14
See application file for complete search history.

(56) References Cited

U.S. PATENT DOCUMENTS

| | | | | |
|---|---|---|---|---|
| 6,322,173 B1 * | 11/2001 | Maguire | ................ | B62D 55/21 305/201 |
| 7,219,968 B2 * | 5/2007 | Hisamatsu | ............. | B62D 55/21 305/201 |
| 7,657,990 B2 * | 2/2010 | Wodrich | ................ | B62D 55/15 305/192 |
| 9,045,180 B2 | 6/2015 | Brewer et al. | | |
| 9,126,645 B2 * | 9/2015 | Hasselbusch | .......... | B62D 55/21 |
| 9,272,742 B2 | 3/2016 | Komatsu | | |
| 9,505,455 B1 * | 11/2016 | Brooks | ................ | B62D 55/213 |
| 9,623,921 B2 | 4/2017 | Wodrich | | |
| 9,719,158 B2 | 8/2017 | Westoby et al. | | |
| 9,790,578 B2 | 10/2017 | Komatsu | | |
| 9,796,436 B2 * | 10/2017 | Johannsen | ............. | B62D 55/21 |
| 9,902,444 B2 | 2/2018 | Neyer | | |
| 10,344,451 B2 * | 7/2019 | Kaufmann | ............. | B62D 55/06 |
| 11,130,532 B2 * | 9/2021 | Steiner | ................... | B62D 55/21 |
| 2014/0152086 A1 | 6/2014 | Meyer et al. | | |
| 2021/0179211 A1 * | 6/2021 | Hakes | .................... | B62D 55/20 |

* cited by examiner

*Primary Examiner* — Kevin Hurley
*Assistant Examiner* — Hosam Shabara
(74) *Attorney, Agent, or Firm* — Law Office of Kurt J. Fugman LLC

(57) ABSTRACT

A track chain assembly includes at least one track link having a shelf extending laterally from the a side surface and including a support surface spaced away from the top surface a predetermined distance measured perpendicularly to the top surface.

20 Claims, 10 Drawing Sheets

SHELF DESIGN FOR INCREASED LINK LIFE

TECHNICAL FIELD

The present disclosure relates to track links, sprocket segments, and idlers used in the undercarriage of heavy equipment using endless track drives. Specifically, the present disclosure relates to a track link used in such undercarriages that may have increased life.

BACKGROUND

In many current applications, track links support the weight of heavy equipment such as those using endless track drives in the earth moving, construction, and mining industries, etc. During use, the track link often contacts various other components of the track chain assembly including the sprocket, the idler, and the track rollers.

Eventually, the track links wear out or develop undesirable wear patterns such as scalloping and the machine is taken out of service to replace the track links, track chain, or otherwise perform maintenance on the undercarriage of the machine. This may result undesirably in increased costs and reduced production for an economic endeavor using the machine.

U.S. Pat. No. 9,045,180 discloses a ground-engaging track system for a machine includes a track extending about a rotatable track engaging element, and having a track chain with a plurality of elongate links each including an upper rail surface formed of a sacrificial wear material and having a convex longitudinal profile configured to delay scallop formation therein. A link for such a track chain and related methodology are also disclosed.

As can be understood, the '180 patent is directed to using a specially design geometry for the rail surface but does not disclose any other mechanisms for improving the wear life of the track link.

SUMMARY

A track link according to an embodiment of the present disclosure comprises a body including a top surface and a bottom surface defining a height therebetween, a first side surface and a second side surface defining a thickness therebetween, and a proximate end and a distal end defining a length therebetween. The body also defines a first bore adjacent the distal end and a second bore adjacent to the proximate end. A shelf may extend laterally from the second side surface and may include a support surface spaced away from the top surface a predetermined distance measured perpendicularly to the top surface.

A replacement kit for an undercarriage assembly according to an embodiment of the present disclosure comprises a track chain assembly including a plurality of track pins and track bushings disposed about the track pins, and a plurality of track links that are connected to each other by either a track pin or a track bushing. At least one track link includes a body defining a top surface, a bottom surface, a first side surface and a second side surface defining a thickness therebetween, a proximate end and a distal end. The body also defines a first bore adjacent the distal end and a second bore adjacent to the proximate end, and includes a shelf extending laterally from the second side surface and having a support surface spaced away from the top surface a predetermined distance measured perpendicularly to the top surface.

An undercarriage assembly according to an embodiment of the present disclosure comprises a track chain assembly including a plurality of track pins and track bushings disposed about the track pins, and a plurality of track links that are connected to each other by either a track pin or a track bushing. At least one track link includes a body defining a top surface, a bottom surface, a first side surface and a second side surface defining a thickness therebetween, a proximate end and a distal end. The body also defines a first bore adjacent the distal end and a second bore adjacent to the proximate end, and a shelf extending laterally from the second side surface and including a support surface spaced away from the top surface a predetermined distance measured perpendicularly to the top surface. The undercarriage assembly may further comprise an idler that is configured to only contact the shelf of the at least one track link, a sprocket defining a notch that is spaced laterally away from shelf of the at least one track link a minimum clearance distance, the sprocket being configured to contact only the plurality of track bushings, and a roller that is configured to contact the top surface of the track link, the roller being spaced away from the shelf of the at least one track link and the plurality of track bushings.

BRIEF DESCRIPTION OF THE DRAWINGS

The accompanying drawings, which are incorporated in and constitute a part of this specification, illustrate several embodiments of the disclosure and together with the description, serve to explain the principles of the disclosure. In the drawings.

DETAILED DESCRIPTION

Figure 1:
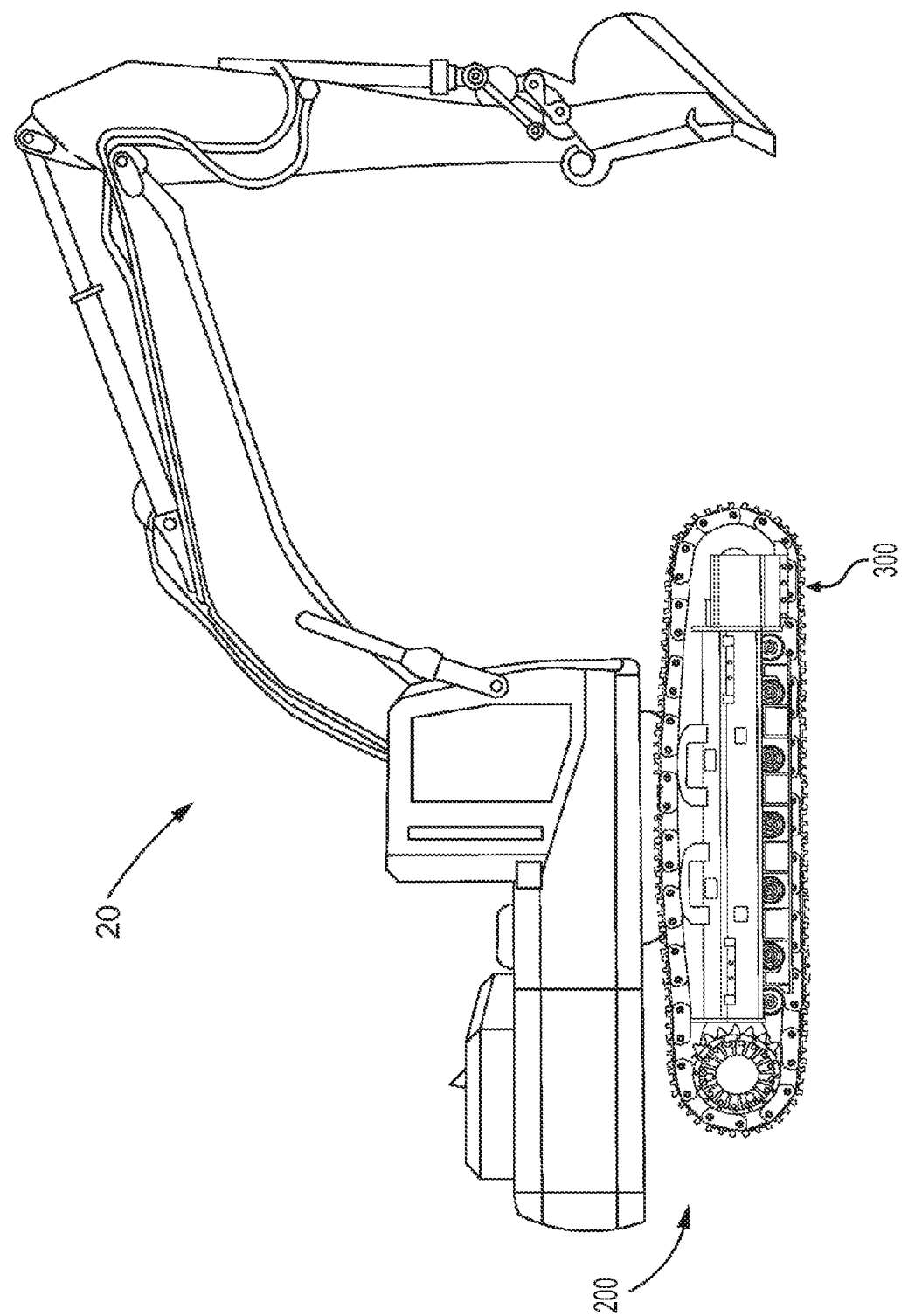
FIG. 1 is a side view of a machine such as an excavator that may employ a track assembly (may also be referred to as an undercarriage assembly) with a track link, idler, and sprocket segments that are configured according to an embodiment of the present disclosure.

Reference will now be made in detail to embodiments of the disclosure, examples of which are illustrated in the accompanying drawings. Wherever possible, the same reference numbers will be used throughout the drawings to refer to the same or like parts. In some cases, a reference number will be indicated in this specification and the drawings will show the reference number followed by a letter for example, 100a, 100b or by a prime for example, 100', 100" etc. It is to be understood that the use of letters or primes immediately after a reference number indicates that these features are similarly shaped and have similar function as is often the case when geometry is mirrored about a plane of symmetry. For ease of explanation in this specification, letters and primes will often not be included herein but may be shown in the drawings to indicate duplications of features, having similar or identical function or geometry, discussed within this written specification.

An undercarriage assembly that may use a track chain assembly with a track link configured according to various embodiments of the present disclosure will now be described. In some embodiments, a replacement kit that includes a track chain assembly, an idler, a sprocket/sprocket member, and/or a track link may be provided. Other configurations for the track chain assembly, idler, sprocket/sprocket member, and track link are possible in other embodiments of the present disclosure.

FIG. 1 shows an embodiment of a tracked machine 20 in the form of an excavator that includes an embodiment of an undercarriage assembly 200 utilizing a track chain assembly 300 constructed in accordance with principles of the present disclosure. Among other uses, an excavator can be used to remove material using a bucket from a work site.

More specifically, FIG. 1 illustrates a machine 20 including an undercarriage system 200 with a track chain assembly 300, consistent with certain embodiments of the present disclosure. It is to be understood that although the machine 20 is illustrated as an excavator, the machine 20 may be of any other type that includes a tracked undercarriage assembly. As used herein, the term "machine" refers to a mobile machine that performs a driven operation involving physical movement associated with a particular industry, such as, earthmoving, construction, landscaping, forestry, mining, agriculture, etc.

While the arrangement is illustrated in connection with an excavator, the arrangement disclosed herein has universal applicability in various other types of machines that employ tracked undercarriage systems, as opposed to wheels. The term "machine" may refer to any machine that performs some type of operation associated with an industry such as mining, earth moving or construction, or any other industry known in the art. For example, the machine may be a hydraulic mining shovel, a cable shovel, a track type tractor, a dozer, or dragline or the like. Moreover, one or more implements may be connected to the machine. Such implements may be utilized for a variety of tasks, including, for example, lifting and loading.

Figure 2:
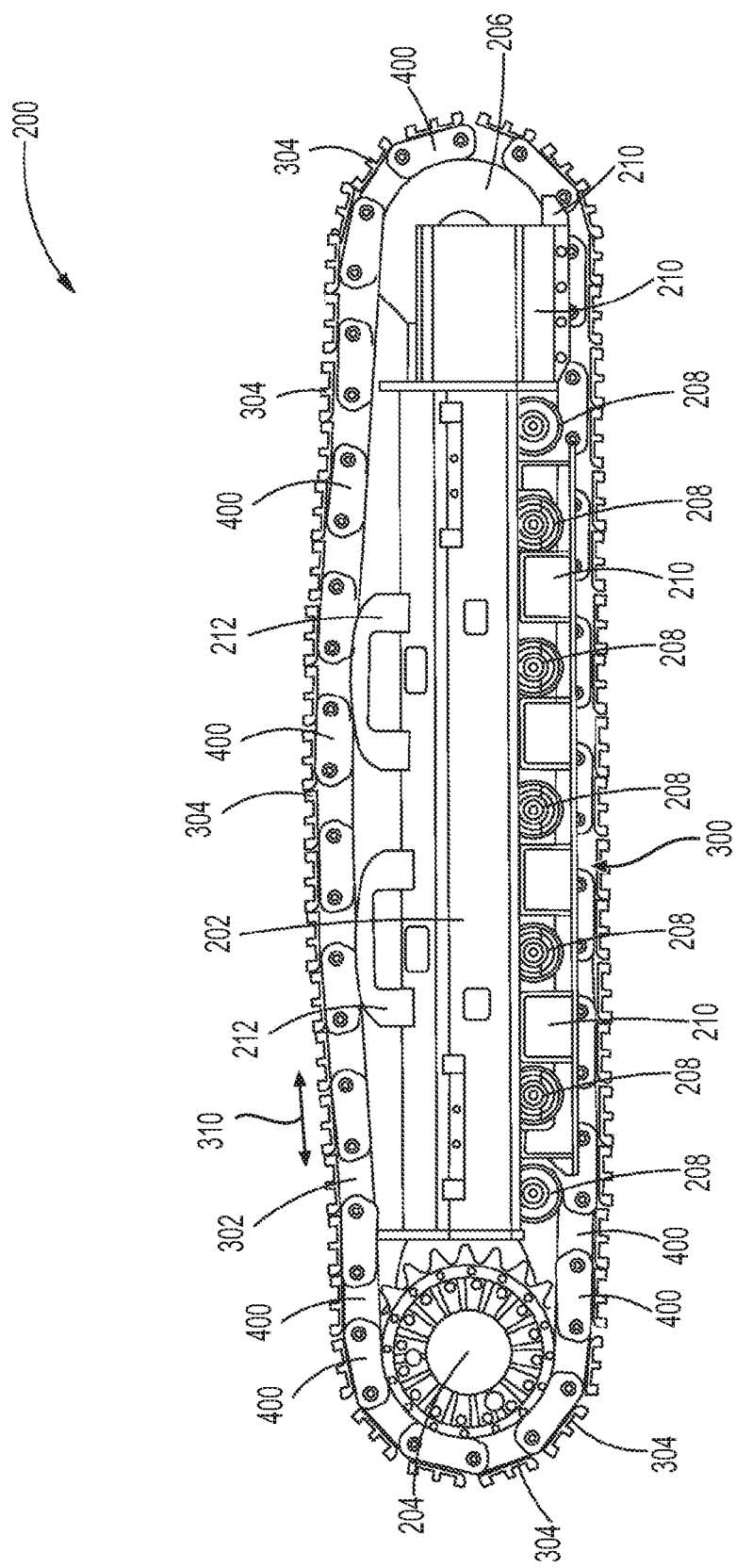
FIG. 2 is a side view of the undercarriage assembly for the machine of FIG. 1.
Figure 3:
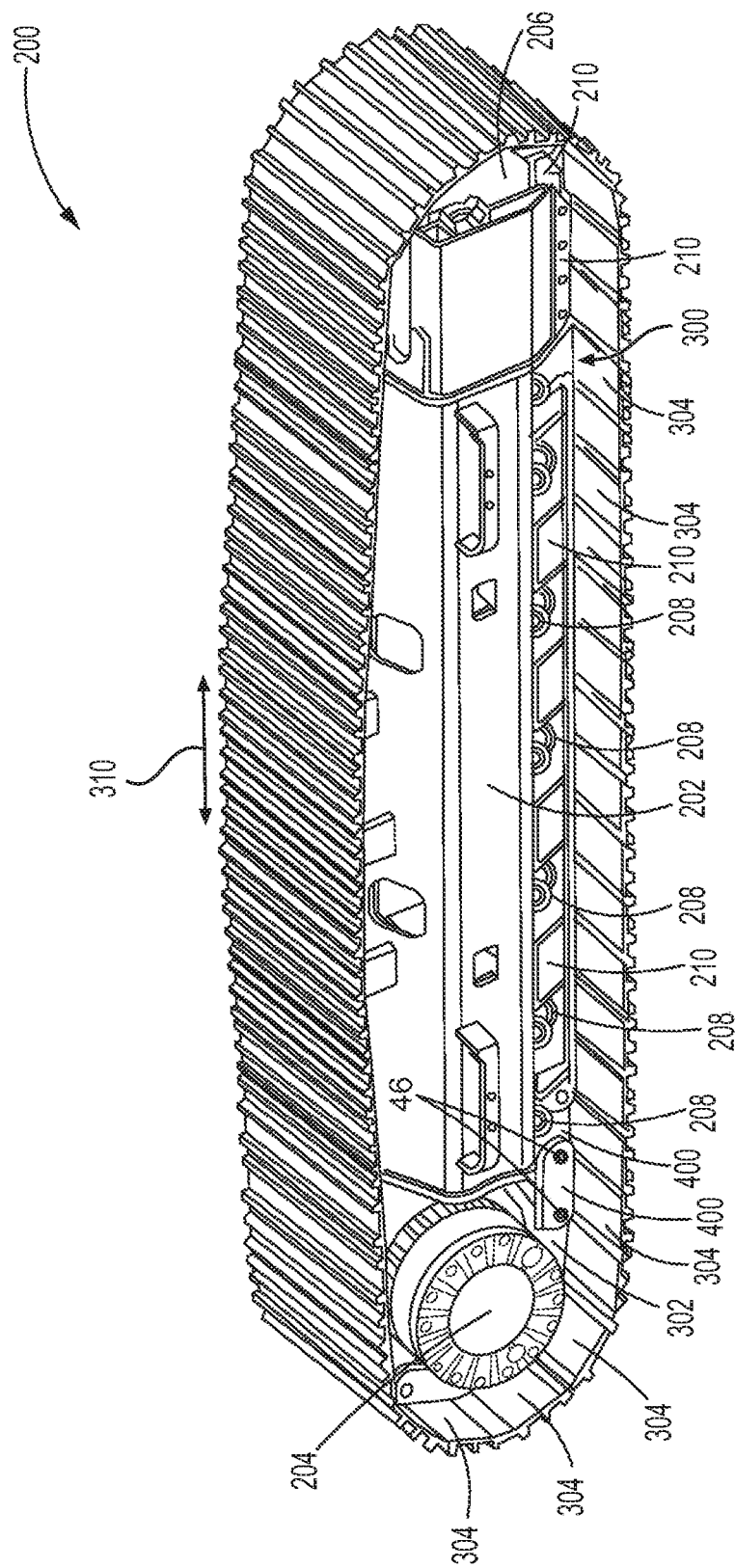
FIG. 3 is a perspective view of the undercarriage assembly of FIG. 2.

The undercarriage assembly 200 may be configured to support the machine 20 and move the machine 20 along the ground, road, and other types of terrain. As shown in FIGS. 2 and 3, the undercarriage assembly 200 may include a track roller frame 202, various guiding components connected to the track roller frame 202, and an endless track such as a track chain assembly 300 engaging the guiding components. The guiding components may guide the track chain assembly 300 and include a drive sprocket 204, an idler 206, track rollers 208, track guides 210, and carriers 212 (or carrier rollers 212' as shown in FIG. 4), although other components may be used and some of the aforementioned components may be omitted in other embodiments, etc.

Figure 4:
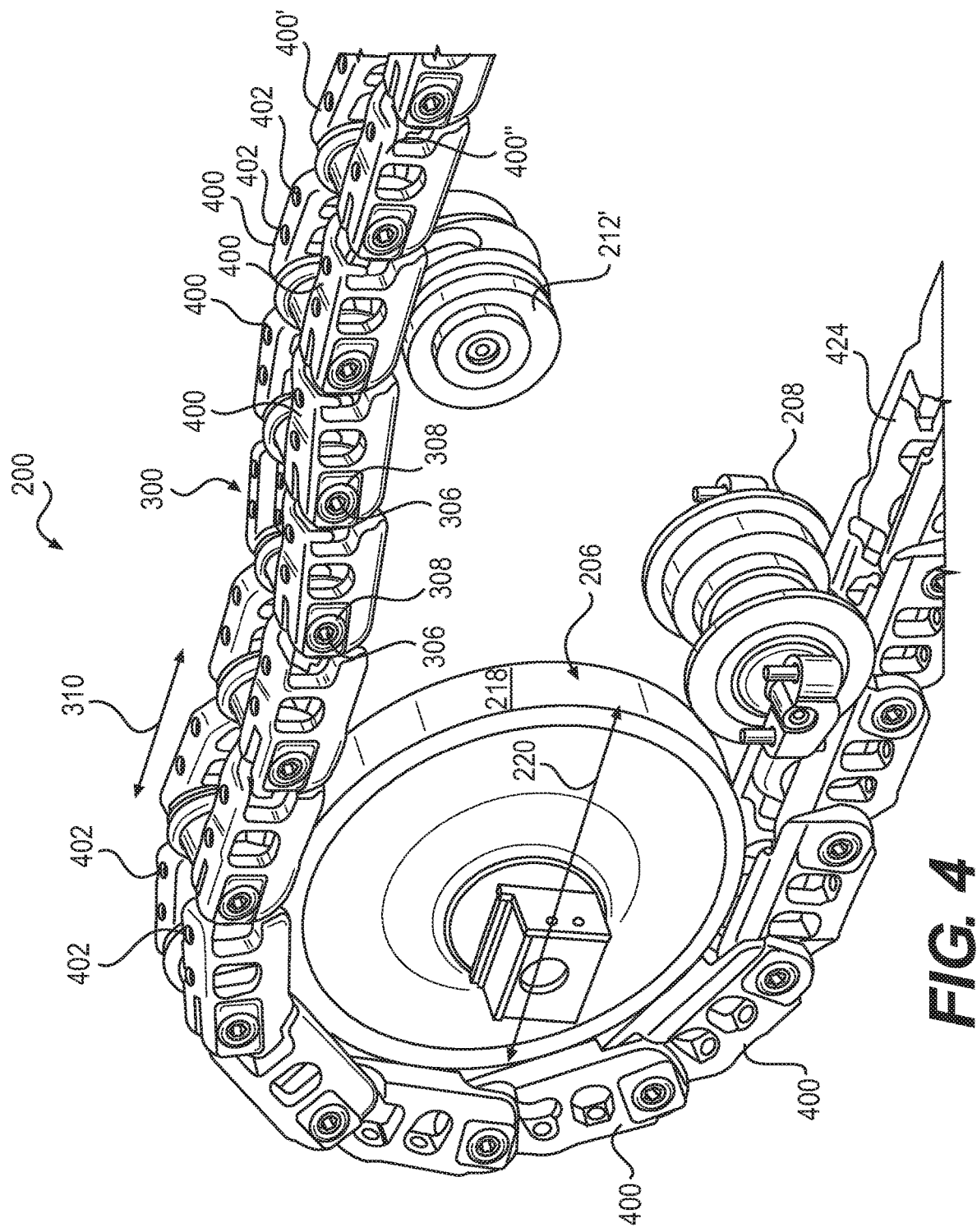
FIG. 4 is a perspective view of a track chain assembly mating with a track roller, carrier roller, and idler removed from the undercarriage assembly of FIG. 3 according to an embodiment of the present disclosure.

Looking at FIGS. 3 and 4 together, the track chain assembly 300 may include a link assembly 302 with a plurality of shoes 304 secured thereto. The link assembly 302 may form a flexible backbone of the track chain assembly 300, and the shoes 304 may provide traction on the various types of terrain. The link assembly 302 may extend in an endless chain around the drive sprocket 204, the track rollers 208, the idler 206, and the carriers 212 or carrier rollers 212'.

The track shoes 304 may be secured to the perimeter of link assembly 302. For example, one shoe 304 may be attached to each laterally spaced pair of the track links 400. The track shoes 304 may be connected to the track links 400 via various methods (e.g. welding, fastening, etc.). To that end, fastening holes 402 may be provided on the bottom surfaces 404 (see FIG. 4) of the track links 400.

Starting with FIG. 4, an embodiment of an undercarriage assembly 200 according to the principles of the present disclosure will now be described.

The undercarriage assembly 200 may comprise a track chain assembly 300 including a plurality of track pins 306 and track bushings 308 disposed about the track pins 306. Also, a plurality of track links 400 that are connected to each other by either a track pin 306 or a track bushing 308.

Figure 7:
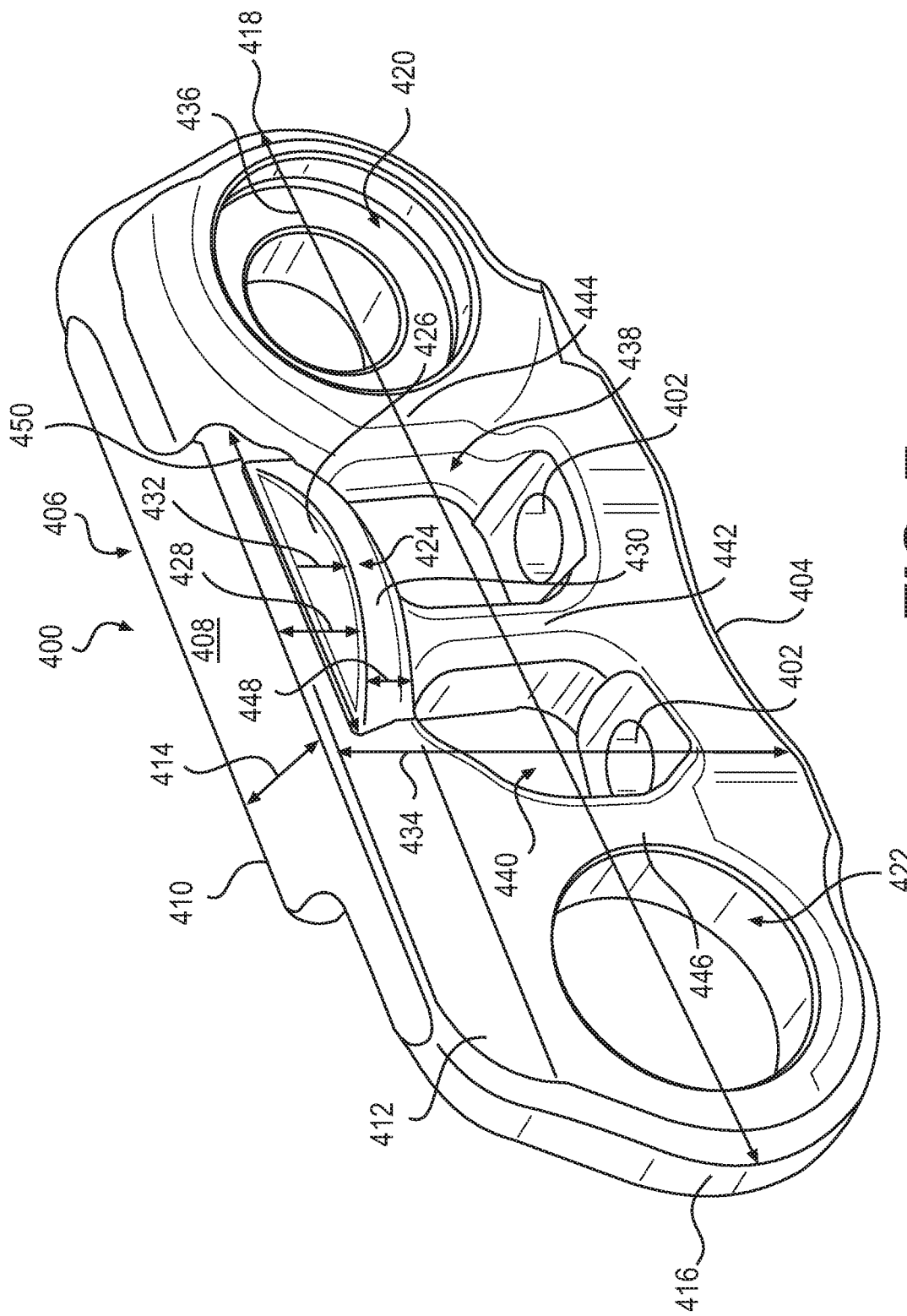
FIG. 7 is a perspective view of the track link employed in the track chain assembly of FIG. 4 removed from the track chain assembly according to an embodiment of the present disclosure.

As best seen in FIG. 7, at least one track link 400 is provided that includes a body 406 defining a top surface 408 (may also be referred to as a rail surface since it contacts the guiding components of the undercarriage assembly), a bottom surface 404, a first side surface 410 and a second side surface 412 defining a thickness 414 therebetween, a proximate end 416, and a distal end 418. The body 406 may further define a first bore 420 that is disposed adjacent the distal end 418, and a second bore 422 that is disposed adjacent to the proximate end 416. Either of these bores may be configured to receive a track bushing and/or a track pin. As shown in FIG. 4, the second bore 422 is configured to receive/contact the track bushing while the first bore 420 is configured to receive/contact both the track bushing and the track pin.

A shelf 424 is provided that extends laterally (i.e. horizontally) from the second side surface 412 that includes a support surface 426 spaced away from the top surface 408 a predetermined distance 428 measured perpendicularly (i.e. vertically) to the top surface 408.

Figure 5:
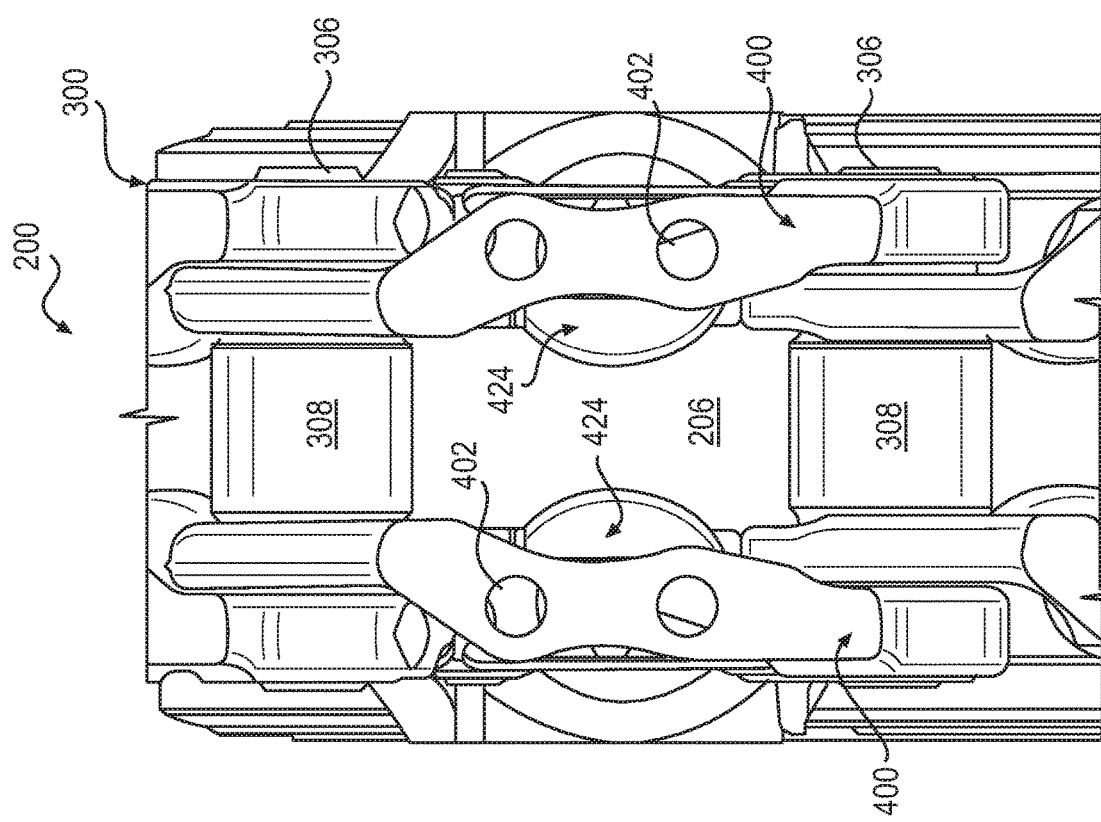
FIG. 5 is a rear view the track chain assembly of FIG. 4, showing the shelf of the track link that contacts the idler.
Figure 12:
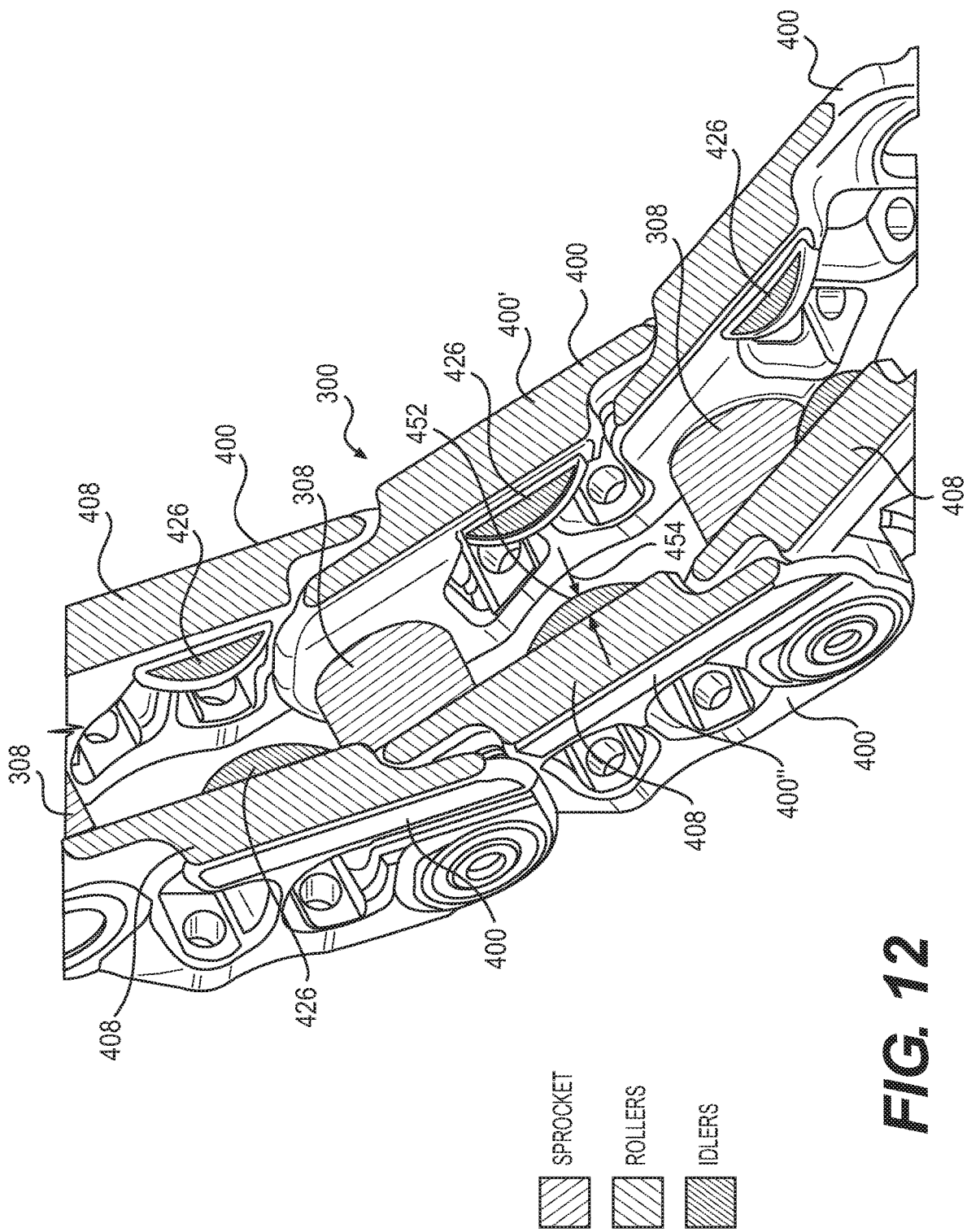
FIG. 12 is a graph showing the various contact regions between various components of the track chain assembly and the track undercarriage. More specifically, the contact region between the bushing and the sprocket segment, the contact region between the shelves of the track links and the idler, and the contact region between the rails of the track links and the rollers are shown.

Looking at FIGS. 4, 5, and 12, an idler 206 (may be constructed of a unitary piece of material or as an assembly) is also provided that is configured to only contact the support surface 426 of the shelf 424 of the at least one track link 400. In many embodiments, a plurality of track links 400 are provided. In some embodiments, all or almost all of the track links have a shelf with a support surface. The support surface area of a single shelf may ranges from 200 mm$^2$ to 700 mm$^2$ in some embodiments of the present disclosure.

Figure 8:
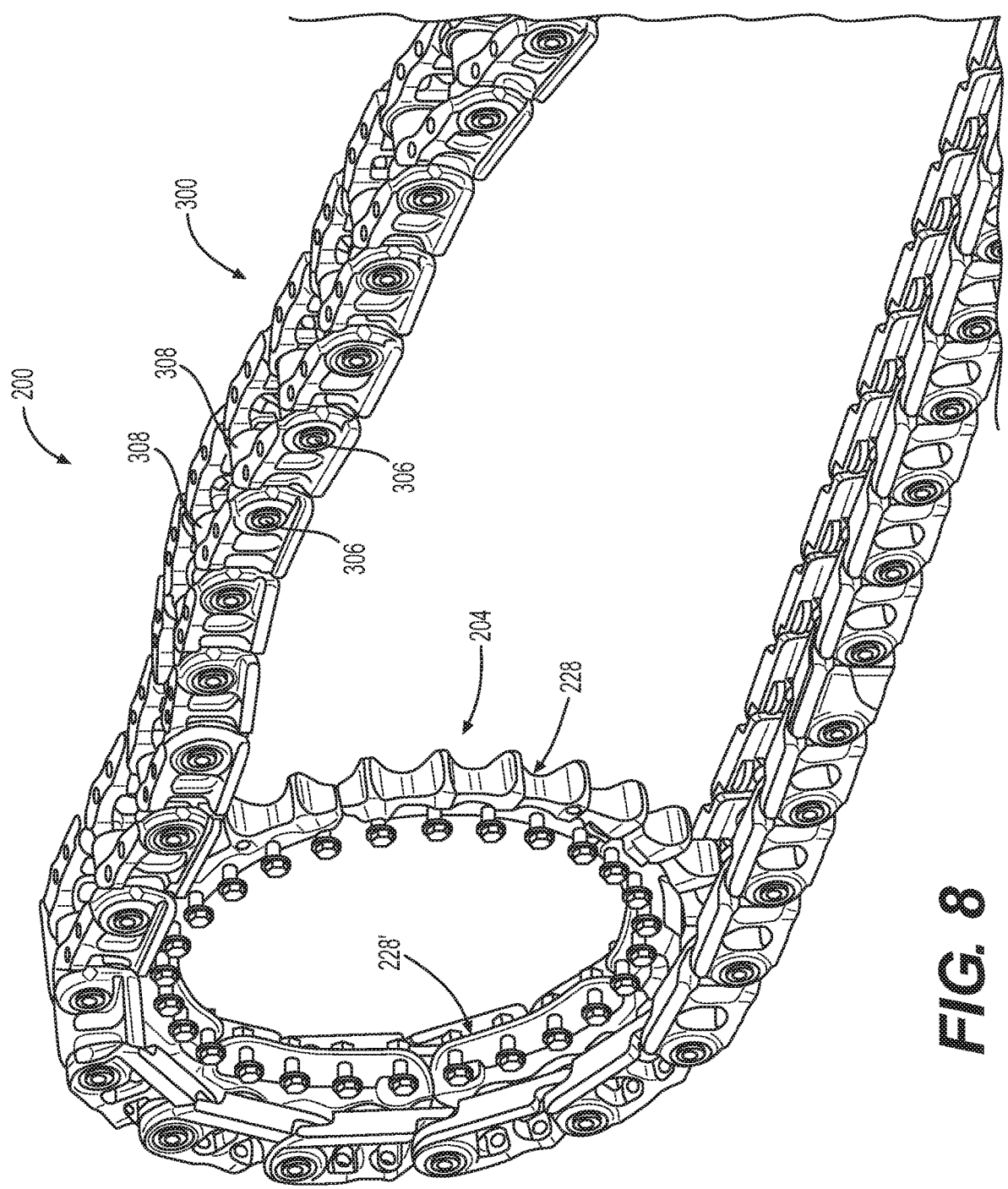
FIG. 8 is a perspective view of the track chain assembly of FIG. 4 mating with a sprocket and its sprocket segments removed from the undercarriage assembly of FIG. 3 according to an embodiment of the present disclosure.
Figure 9:
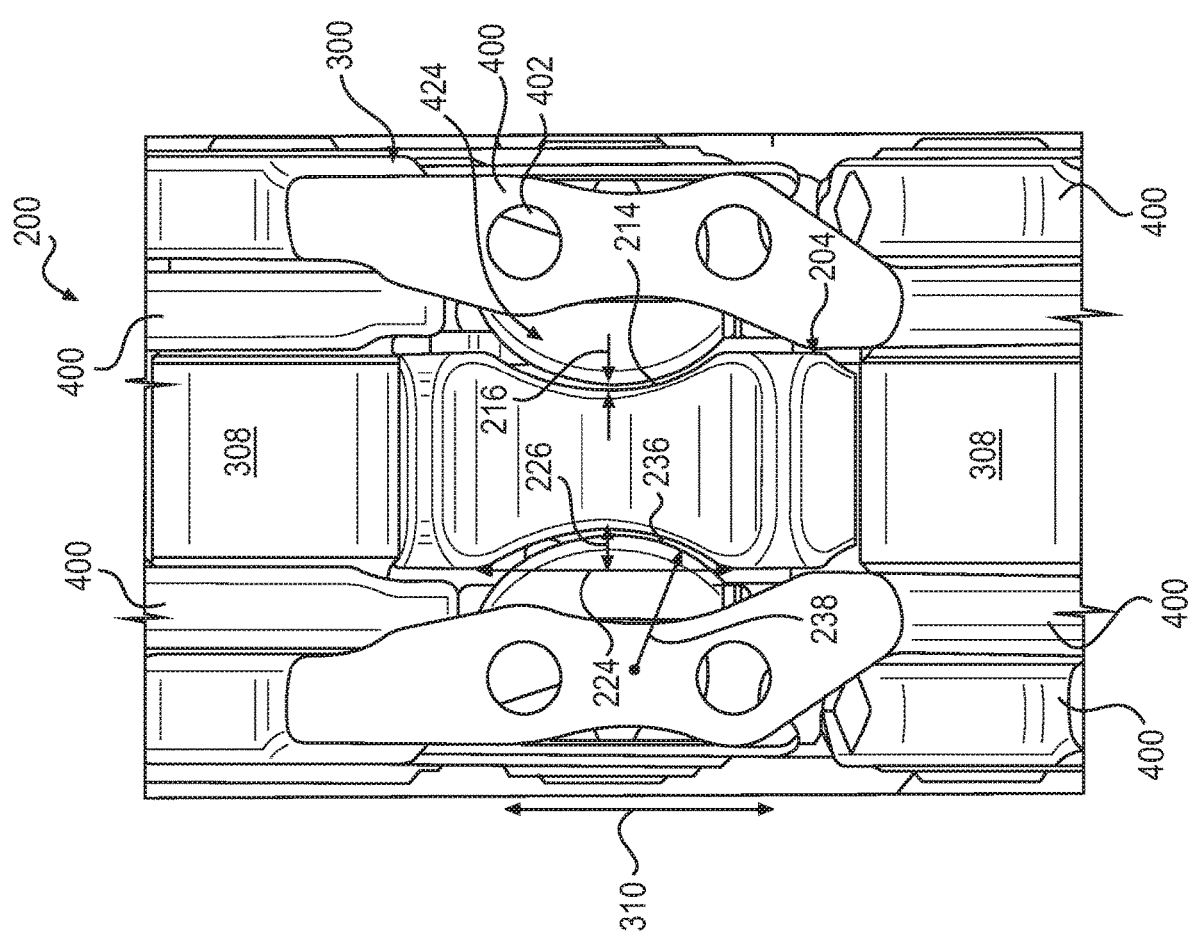
FIG. 9 is a top view of the track chain assembly FIG. 8 showing the clearance between the sprocket segments and the shelves of the track links.

Referring now to FIGS. 8, 9, and 12, the undercarriage assembly 200 may also have a drive sprocket 204 (may be constructed of a unitary piece of material or as an assembly as indicated by FIG. 8, note that the hub is not shown in FIG. 8) that defines a notch (214) that is spaced laterally (i.e. horizontally) away from the shelf 424 (see FIG. 9) of the at least one track link 400 a minimum clearance distance 216. As such, the drive sprocket 204 may be configured to contact only the plurality of track bushings 308 (see FIG. 12). In some embodiments, the minimum clearance distance may range from 25.0 mm to 200.0 mm.

In addition as best understood by looking at FIGS. 4 and 12, a roller (e.g. track roller 208 or carrier roller 212') may be configured to contact the top surface 408 of the track link 404. Also, the roller is spaced away (e.g. vertically or horizontally) from the shelf 424 of the at least one track link 400 and the plurality of track bushings 308, avoiding contact with these components.

Figure 6:
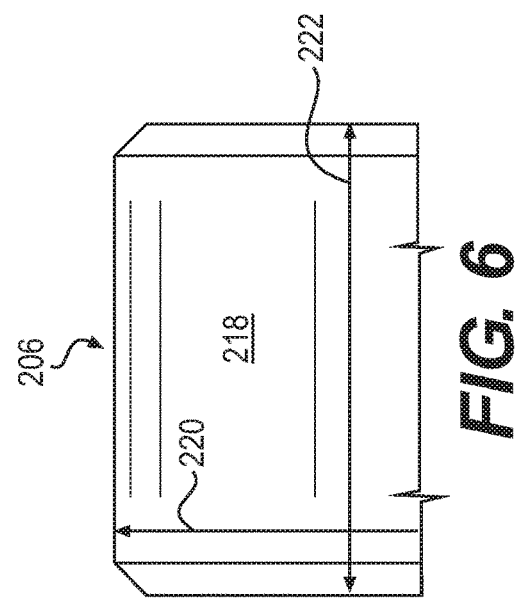
FIG. 6 is an enlarged detail view of the circumference of the idler removed from FIG. 4, illustrating its simple configuration.

As best seen in FIGS. 4 and 6, the idler 206 may comprise a single continuous circumferential surface 218 defining an overall diameter 220. The idler 206 may further define an overall width 222, and a ratio of the overall diameter 220 to the overall width 222 may range from 10.0 to 20.0 in some embodiments. In particular embodiments, the overall diameter 220 may range from 500.0 mm to 1250.0 mm, while the overall width 222 may range from 25.0 mm to 125.0 mm in some embodiments.

Looking at FIGS. 4 and 12, the track chain assembly 300 may comprise a series of outboard links 400' and a series of inboard links 400", and the shelf 424 and the plurality of track bushings 308 are interposed between the series of outboard links 400' and the series of inboard links 400". Also, the idler 206 is disposed between the series of outboard links 400' and inboard links 400", so that the idler 206 contacts the shelf 424 of the at least one track link 400.

Moreover, the track chain assembly 300 defines a direction of travel 310 (e.g. see FIG. 4), and the drive sprocket 204 defines a notch length 224 (see FIG. 9) measured along the direction of travel 310 and a notch width 226 measured along a lateral direction (i.e. horizontal direction) that is perpendicular to the direction of travel 310. In some embodiments, the notch length 224 may range from 80.0 mm to 175.0 mm, and the notch width 226 may range from 18.0 mm to 50.0 mm in some embodiments.

As alluded to earlier herein, the drive sprocket 204 comprises a sprocket segment 228, 228' (see FIGS. 10 and 11) that defines a radial direction 230, 230' and includes an angled support 232 (see FIG. 11) that forms an included angle 234 with the radial direction 230 (in a plane containing the radial direction and the axis of rotation of the sprocket) that ranges from 6.0 degrees to 9.0 degrees in some embodiments. These sprocket segments may be configured to be attached (e.g. via fastening) to a hub to form a sprocket assembly.

Referring once more to FIG. 7, the shelf 424 of the at least one track link 400 may include a lateral convex arcuate surface 430 defining a radius of curvature 432 ranging from 20.0 mm to 60.0 mm in some embodiments.

As alluded to earlier herein, a replacement kit may be for the undercarriage assembly 200. Such a kit may have a track chain assembly 300 similar to or identical as that described above. Also, an idler 206 may be provided that is similar to or identical as that described above.

Figure 10:
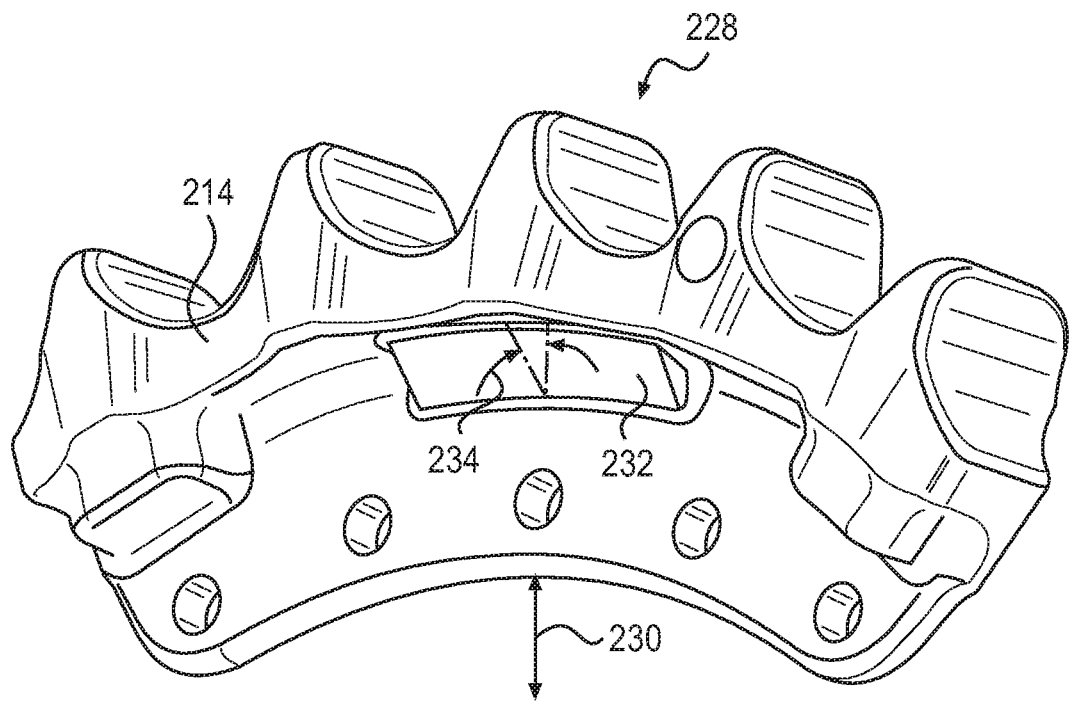
FIG. 10 is a rear perspective view of the sprocket segment of FIG. 9 shown in isolation according to an embodiment of the present disclosure.
Figure 11:
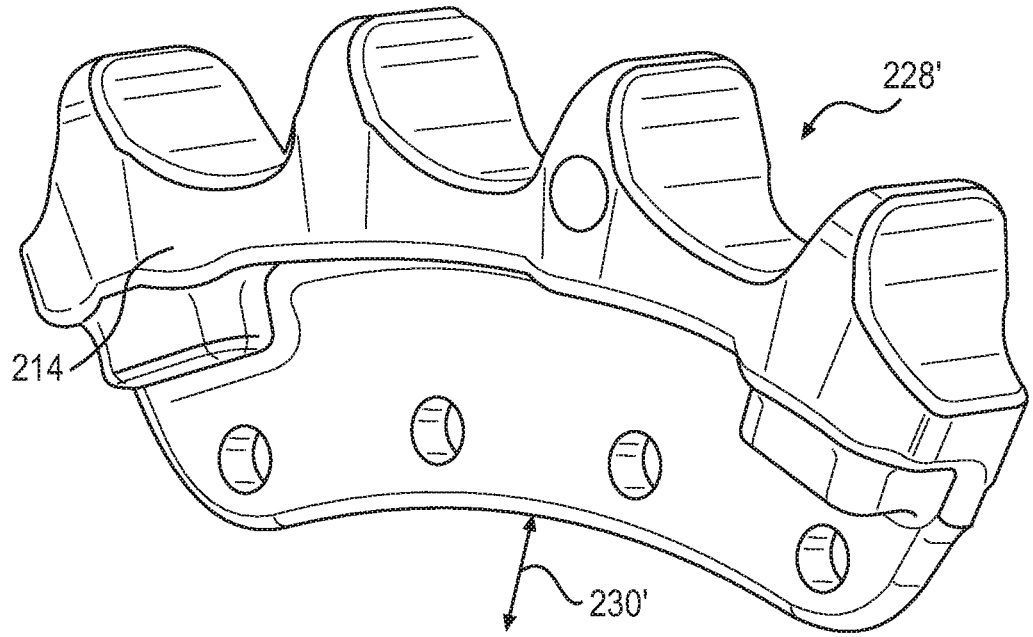
FIG. 11 is a rear perspective view of another sprocket segment shown in isolation according to another embodiment of the present disclosure that may be used in the track chain assembly of FIG. 9.

The replacement kit may also include a sprocket segment 228, 228' as shown in FIGS. 9 thru 11 that has a notch 214 that is complimentarily shaped to the shelf 424 of the at least one track link 400. For example in FIG. 9, the notch 241 defines a lateral concave arcuate surface 236 defining a concave radius of curvature 238 ranging from 20.0 mm to 60.0 mm in some embodiments.

Also, the track link 400 itself may be provided as a replacement part.

In FIG. 7, the body 406 of the track link 400 includes a top surface 408 (may also be referred to as a rail surface) and a bottom surface 404 defining a height 434 therebetween, a first side surface 410 and a second side surface 412 defining a thickness 414 therebetween, a proximate end 416 and a distal end 418 defining a length 436 therebetween.

The body 406 also defines a first bore 420 that is disposed adjacent the distal end 418 and a second bore 422 that is disposed adjacent to the proximate end 416 as previously described herein.

In certain embodiments, the body 406 further defines a first aperture 438 that is disposed between the first bore 420 and the second bore 422. Specifically, the first aperture 438 may be disposed nearer the first bore 420 than the second bore 422. Also, a second aperture 440 may be disposed between the first aperture 438 and the second bore 422. These apertures may be configured to receive nuts that are attached to fasteners for securing the track shoes to the bottom surface 404, and may be omitted in some embodiments of the present disclosure.

A first strut 442 separates the first aperture 438 from the second aperture 440, while a second strut 444 separates the first aperture 438 from the first bore 420. A bridge 446 separates the second aperture 440 and the second bore 422.

The shelf 424 extends laterally (e.g. inboard direction) from the second side surface 412, and includes a support surface 426 that is spaced away from the top surface 408 a predetermined distance 428 measured perpendicularly to the top surface 408. The shelf 424 may also be disposed above the first aperture 438 and the second aperture 440 but not necessarily so.

The track link 400 shown in the figures is an offset link, so called since it jogs and has an "s" or "z" configuration when viewed from the top. The track link may be a straight link in other embodiments, such as when the link has a "t" configuration when viewed from the top. Also, the bores may be differently configured and used differently than specifically shown or described herein.

In some embodiments, a ratio of the height 434 of the track link 400 to the predetermined distance 428 may range from 10.0 to 30.0. In such embodiments, the predetermined distance 428 may range from 2.0 mm to 18.0 mm, and the shelf 424 defines a shelf height 448 that ranges from 60.0 mm to 200.0 mm.

Similarly, the shelf 424 defines a shelf length 450 (i.e. the maximum length) and a ratio of the length of the link 436 to shelf length 450 may range from 4.0 to 8.0 in certain embodiments. In such an embodiment, the shelf length 450 may range from 30.0 mm to 100.0 mm.

The shelf 424 includes a lateral arcuate surface (e.g. lateral convex arcuate surface 430) defining a radius of curvature 238 and that defines a lateral extremity 452 spaced away (e.g. horizontally) from the second side surface 412 a lateral distance 454 (see FIG. 12).

In some embodiments, a ratio of the thickness 414 of the link 400 to the lateral distance 454 may range from 2.0 to 4.0. In such a case, the radius of curvature 238 may range from 20.0 mm to 60.0 mm, and the lateral distance 454 may range from 10.0 mm to 50.0 mm.

As used herein, the articles "a" and "an" are intended to include one or more items, and may be used interchangeably with "one or more." Where only one item is intended, the term "one" or similar language is used. Also, as used herein, the terms "has", "have", "having", "with" or the like are intended to be open-ended terms. Further, the phrase "based on" is intended to mean "based, at least in part, on" unless explicitly stated otherwise.

It should be noted that these ratios and dimensional ranges may be altered to be different in other embodiments of the present disclosure.

For many embodiments, the track link, idler, sprocket, and/or sprocket segment may be cast using iron, grey-iron, steel or other suitable materials. Other materials may be used as well as other manufacturing processes to make the track link, sprocket, sprocket member, and/or idler such as any type of machining, forging, etc. Also, the configurations of any of the features discussed herein, as well as their dimensions, and/or their ratios of dimensions may be different than what has been specifically stated herein depending on the intended application.

INDUSTRIAL APPLICABILITY

In practice, a track link, a track chain assembly, an idler, a sprocket, a sprocket member, and/or an undercarriage assembly according to any embodiment described herein may be sold, bought, manufactured or otherwise obtained in an OEM (Original Equipment Manufacturer) or after-market context.

The various embodiments of the track link, idler, etc. may improve the life of the track link or trach chain assembly when employed in an undercarriage assembly by reducing the amount of pressure exerted on these various components by the sprocket and/or idler since only the rollers contact the rails of the track links. Specifically, unwanted wear forms such as scalloping may be reduced, prolonging the useful life of the track links and/or the track chain assembly.

It will be apparent to those skilled in the art that various modifications and variations can be made to the embodiments of the apparatus and methods of assembly as discussed herein without departing from the scope or spirit of the invention(s). Other embodiments of this disclosure will be apparent to those skilled in the art from consideration of the specification and practice of the various embodiments disclosed herein. For example, some of the equipment may be constructed and function differently than what has been described herein and certain steps of any method may be omitted, performed in an order that is different than what has been specifically mentioned or in some cases performed simultaneously or in sub-steps. Furthermore, variations or modifications to certain aspects or features of various embodiments may be made to create further embodiments and features and aspects of various embodiments may be added to or substituted for other features or aspects of other embodiments in order to provide still further embodiments.

Accordingly, it is intended that the specification and examples be considered as exemplary only, with a true scope and spirit of the invention(s) being indicated by the following claims and their equivalents.

What is claimed is:

1. A track link comprising:
   a body including a top surface and a bottom surface defining a height therebetween, a first side surface and a second side surface defining a thickness therebetween, a proximate end and a distal end defining a length therebetween; wherein
   the body defines a first bore adjacent the distal end and a second bore adjacent to the proximate end; and
   a shelf extending laterally from the second side surface and including a support surface spaced away from the top surface a predetermined distance measured perpendicularly to the top surface.

2. The track link of claim 1 wherein the body defines
   a first aperture disposed between the first bore and the second bore, the first aperture being disposed nearer the first bore than the second bore;
   the body defines a second aperture disposed between the first aperture and the second bore;
   the body includes a first strut disposed between the first aperture and the second aperture;
   the body includes a second strut disposed between the first aperture and the first bore;
   the body includes a bridge disposed between the second aperture and the second bore;
   the shelf also being disposed above the first aperture and the second aperture; and
   a ratio of the height of the track link to the predetermined distance ranges from 10.0 to 30.0.

3. The track link of claim 2 wherein the predetermined distance ranges from 2.0 mm to 18.0 mm, and the shelf defines a shelf height that ranges from 60.0 mm to 200.00 mm.

4. The track link of claim 1 the shelf defines a shelf length and a ratio of the length of the link to the shelf length ranges from 4.0 to 8.0.

5. The track link of claim 4 wherein the shelf length ranges from 30.0 mm to 100.0 mm.

6. The track link of claim 1 wherein the shelf includes a lateral arcuate surface defining a radius of curvature and that defines a lateral extremity spaced away from the second side surface a lateral distance, and a ratio of the thickness of the link to the lateral distance ranges from 2.0 to 4.0.

7. The track link of claim 6 wherein the radius of curvature ranges from 20.0 mm to 60.0 mm and the lateral distance ranges from 10.0 mm to 50.0 mm.

8. A replacement kit for an undercarriage assembly comprising:
   a track chain assembly including
      a plurality of track pins and track bushings disposed about the track pins; and
      a plurality of track links that are connected to each other by either a track pin or a track bushing;
      at least one track link including
         a body defining a top surface, a bottom surface, a first side surface and a second side surface defining a thickness therebetween, a proximate end and a distal end; wherein
         the body defines a first bore adjacent the distal end and a second bore adjacent to the proximate end;
         a shelf extending laterally from the second side surface and including a support surface spaced away from the top surface a predetermined distance measured perpendicularly to the top surface.

9. The replacement kit of claim 8 further comprising an idler including a single continuous circumferential surface defining an overall diameter, the idler further defining an overall width, and a ratio of the overall diameter to the overall width ranges from 10.0 to 20.0.

10. The replacement kit of claim 8 further comprising a sprocket segment defining a notch that is complimentarily shaped to the shelf of the at least one track link.

11. The replacement kit of claim 10 wherein the shelf defines a lateral convex arcuate surface defining a radius of curvature ranging from 20.0 mm to 60.0 mm, and the notch defines a lateral concave arcuate surface defining a concave radius of curvature ranging from 20.0 mm to 60.0 mm.

12. An undercarriage assembly comprising:
a track chain assembly including
a plurality of track pins and track bushings disposed about the track pins; and
a plurality of track links that are connected to each other by either a track pin or a track bushing;
the at least one track link including
a body defining a top surface, a bottom surface, a first side surface and a second side surface defining a thickness therebetween, a proximate end and a distal end; wherein
the body defines a first bore adjacent the distal end and a second bore adjacent to the proximate end;
a shelf extending laterally from the second side surface and including a support surface spaced away from the top surface a predetermined distance measured perpendicularly to the top surface;
an idler that is configured to only contact the shelf of the at least one track link;
a sprocket defining a notch that is spaced laterally away from shelf of the at least one track link a minimum clearance distance, the sprocket being configured to contact only the plurality of track bushings; and
a roller that is configured to contact the top surface of the track link, the roller being spaced away from the shelf of the at least one track link and the plurality of track bushings.

13. The undercarriage assembly of claim 12 wherein the minimum clearance distance ranges from 25.0 mm to 200.00 mm, and the support surface defines a support surface area that ranges from 200 mm$^2$ to 700 mm$^2$.

14. The undercarriage assembly of claim 12 wherein the idler comprises a single continuous circumferential surface defining an overall diameter, the idler further defining an overall width, and a ratio of the overall diameter to the overall width ranges from 10.0 to 20.0.

15. The undercarriage assembly of claim 14 wherein the overall diameter ranges from 500.0 mm to 1250.0 mm, the overall width ranges from 25.0 mm to 125.0 mm.

16. The undercarriage assembly of claim 15 wherein the track chain assembly comprises a series of outboard links and a series of inboard links, the shelf and the plurality of track bushings are interposed between the series of outboard links and the series of inboard links, and the idler is disposed between the series of outboard links and inboard links, and contacting the shelf of the at least one track link.

17. The undercarriage assembly of claim 12 wherein the track chain assembly defines a direction of travel, and the sprocket defines a notch length measured along the direction of travel and a notch width measured along a lateral direction that is perpendicular to the direction of travel.

18. The undercarriage assembly of claim 17 wherein the notch length ranges from 80.0 mm to 175.0 mm and the notch width ranges from 18.0 mm to 50.0 mm.

19. The undercarriage assembly of claim 12 wherein the sprocket comprises a sprocket segment defining a radial direction and including an angled support that forms an included angle with the radial direction that ranges from 6.0 degrees to 9.0 degrees.

20. The undercarriage assembly of claim 12 wherein the shelf of the at least one track link includes a lateral convex arcuate surface defining a radius of curvature ranging from 20.0 mm to 60.0 mm.

* * * * *